United States Patent [19]

Orgun et al.

[11] Patent Number: 5,034,896
[45] Date of Patent: Jul. 23, 1991

[54] METHOD AND APPARATUS FOR REAL TIME ESTIMATION OF AIRCRAFT CENTER OF GRAVITY

[75] Inventors: Munir Orgun, Woodinville; Sean J. Flannigan, Seattle, both of Wash.

[73] Assignee: The Boeing Company, Seattle, Wash.

[21] Appl. No.: 470,577

[22] Filed: Jan. 26, 1990

[51] Int. Cl.$^5$ .............................................. G01M 1/12
[52] U.S. Cl. ........................................ 364/463; 73/65
[58] Field of Search ............... 364/463, 434, 435, 439, 364/428; 73/65; 178 T; 235/61 T

[56] References Cited

U.S. PATENT DOCUMENTS

| | | | |
|---|---|---|---|
| 4,110,605 | 8/1978 | Miller | 364/463 |
| 4,490,802 | 12/1984 | Miller | 73/178 T |
| 4,545,019 | 10/1985 | Glover | 364/463 |
| 4,937,754 | 6/1990 | Buisson et al. | 364/463 |
| 4,949,269 | 8/1990 | Buisson et al. | 364/463 |

Primary Examiner—Parshotam S. Lall
Assistant Examiner—Michael Zanelli
Attorney, Agent, or Firm—Christensen, O'Connor Johnson & Kindness

[57] ABSTRACT

Disclosed is a method of and an arrangement for real time estimation of the location of the center of gravity of an aircraft. The center of gravity estimate is utilized in an aircraft flight control system for effecting flight control laws in which the center of gravity is a parameter that at least in part establishes open loop compensation or feedback gain. The disclosed method and arrangement are specifically adapted for establishing stabilizer mistrim during a landing procedure in which an aircraft flight control system is automatically controlling the aircraft. The method generally comprises the steps of generating a signal that represents the product of the aircraft stabilizer position and a multiplicative factor, $A_1$ and adding to that product an additive factor, $A_2$. The multiplicative factor, $A_1$, and the additive factor, $A_2$, both are determined on the basis of the angle of attack of the aircraft and the aircraft flap setting.

9 Claims, 5 Drawing Sheets

METHOD AND APPARATUS FOR REAL TIME ESTIMATION OF AIRCRAFT CENTER OF GRAVITY

FIELD OF THE INVENTION

This invention relates to aircraft flight control and navigation systems and more specifically, to methods and apparatus for providing a real time estimate of the aircraft center of gravity for use in such systems.

BACKGROUND OF THE INVENTION

There are numerous situations in which the location of an aircraft's center of gravity has an effect on the manner in which the aircraft control surfaces are operated to maneuver and navigate the aircraft. Thus, in automatic flight control systems it is necessary to at least estimate aircraft center of gravity in order to generate proper command signals. Since no onboard equipment exists for determining the center of gravity, the practice has been to use a worst case estimate of the center of gravity in automatic flight control situations in which center of gravity is an important parameter. Although the practice of using a worst case estimate provides generally satisfactory results, less than optimal control action may result and certain disadvantages and drawbacks may arise.

One situation in which location of aircraft center of gravity is important in automatic flight control is the use of stabilizer mistrim during the final stages of an automatic landing procedure. As is known in the art, stabilizer mistrim is utilized in automatic landing procedures to cause a flare-like maneuver in the event of an automatic landing system disconnect caused by a system failure or by the pilot taking manual control of the aircraft. Specifically, during final approach, the automatic landing system drives the stabilizer in a nose-up direction by supplying a command signal to the elevator trim. Opposite elevator is commanded by the system as the stabilizer moves to cancel the pitching moment produced by the stabilizer nose-up command signal. In the event of automatic landing system disconnect, a pitch-up moment is generated as the elevator moves to its neutral position. Thus, the rate of descent (sink rate) is slowed and the pilot is given adequate time to assume control and execute a relatively normal landing (e.g., without an excessively high sink rate or the aircraft nose gear contacting the runway before the main gear).

Optimal stabilizer mistrim primarily depends on the aircraft approach speed, the flap setting being used during the landing procedure and the location of the aircraft's center of gravity. Prior to the advent of this invention, only two options were available for applying stabilizer mistrim during automatic landing procedures. First, the automatic landing system could employ a fixed or predetermined amount of stabilizer mistrim based upon information gathered during flight tests and/or an estimated worst case aircraft configuration and approach speed. Alternatively, a worst case center of gravity location would be assumed and signals representative of the aircraft approach speed and flap setting could be processed to provide stabilizer mistrim that is at least partially compensated for the actual landing profile of the aircraft.

Worst case center of gravity location for automatic landing stabilizer mistrim occurs with a heavily loaded aircraft and the center of gravity located at its most forward position. However, establishing stabilizer mistrim for worst case center of gravity location can result in more than the desired nose-up pitching moment should the automatic landing system be disengaged during the landing procedure. For example, with respect to one particular aircraft and automatic landing system, it was determined that the amount of stabilizer mistrim required for a lightly loaded airplane with its center of gravity at the aftmost position was 34% less elevator than was required with a heavily loaded airplane in which the center of gravity was at the forwardmost position. Establishing stabilizer mistrim based on the worst case center of gravity situation (aircraft heavily loaded/center of gravity forward), thus meant that a fairly significant pitch-up attitude could result if the automatic landing system was disengaged while the aircraft was lightly loaded and the center of gravity was located at its aftmost position. With this particular system, the situation could be further complicated if the automatic landing system was disconnected prior to the point at which the aircraft automatic throttle system was operated to retard engine throttle settings. In that situation, if the pilot did not immediately manually retard the throttle settings, the throttle could be further advanced by the aircraft autothrottle system and additional nose-up attitude would result.

Although establishing stabilizer mistrim on the basis of worst case expected center of gravity location achieves the goal of allowing adequate time for the pilot to assume manual control and execute a safe landing, the more than sufficient pitch-up attitude that results when the aircraft is lightly loaded and its center of gravity is located nearer the aftmost position is at least somewhat undesired. In this regard, placing the aircraft in a nose-up attitude that is more than sufficient for the assumption of manual control and safe landing can result in a longer than normal landing distance. That is, because of the time required for the pilot to restore the aircraft to a relatively normal landing profile, the aircraft will not touch down on the runway as early as it would had less stabilizer mistrim been applied by the automatic landing system. Under extreme conditions, it may be necessary for the pilot to apply fairly substantial nose-down manual control and, in some cases, execute other fairly aggressive maneuvers in order to quickly bring the aircraft into the desired landing profile.

A need for even occasional substantial nose-down manual command and/or other relatively aggressive manual control of the aircraft gives rise to two relatively important operational considerations of an automatic landing system. First, it is important that pilots that operate aircraft equipped with an automatic landing system have a high degree of confidence in the system. This confidence is necessary both to obtain certification of a system by regulatory authorities and, in addition, to insure that pilots do not prematurely disengage the system when adverse conditions are encountered. Some automatic landing systems utilizing worst case center of gravity estimation to establish stabilizer mistrim could, in the event of system disconnect, produce excessive nose-up pitching moment under lightly loaded and aft center of gravity conditions that would cause concern on the part of at least some of the pilots flying aircraft equipped with the system. The second consideration is that of passenger comfort and confidence. Specifically, even though an aircraft is operating well within safe bounds, passengers can become apprehensive, concerned and uncomfortable during somewhat aggressive maneuvering of the airplane. Thus, using worst case center of gravity conditions to establish stabilizer mistrim in an automatic landing system can result in unnecessary passenger concern and discomfort should the automatic landing system be disengaged and manual pilot control be asserted during an automatic landing procedure in which the aircraft is lightly loaded and the center of gravity is located in an aft position.

For the above-discussed reasons there is a need for an arrangement that provides real time estimation of the aircraft's center of gravity to thereby allow stabilizer mistrim that is adapted to or compensated for actual landing conditions. Further it will be recognized by those skilled in the art that there are numerous other situations in which aircraft center of gravity is used in establishing open loop compensation or feedback gains control laws that are used by automatic flight control systems to navigate and control an aircraft. In many cases, performance of such systems also can be improved by utilizing a real time center of gravity estimate instead of a predetermined, worst case estimate.

SUMMARY OF THE INVENTION

The present invention provides a method of and apparatus for estimating and locating aircraft center of gravity while the aircraft is in flight and executing a maneuver procedure that at least in part depends upon the aircraft's center of gravity. That is, in accordance with the invention, a real time estimate of the aircraft's center of gravity is made available for use by the aircraft flight control and navigation systems so that the command signals generated by those systems are based on an accurate estimate of the aircraft center of gravity rather than a worst case design value.

The method generally comprises the steps of multiplying a signal representative of the aircraft stabilizer setting by a first multiplicative factor, $A_1$, and adding to the product of stabilizer position and the first multiplicative factor a first additive factor $A_2$. The first multiplicative factor $A_1$ and first additive factor $A_2$ are both dependent upon and determined by the aircraft flap setting and the aircraft angle of attack at the time that the center of gravity estimate is being provided.

In the disclosed arrangement, the center of gravity estimate is provided during an automatic landing procedure and is utilized to establish stabilizer mistrim. In this arrangement, the method includes the step of determining whether the aircraft flap setting is a first predetermined value (e.g., 25°) or a second predetermined value (30°). When the aircraft flap setting is 25°, the first multiplicative factor is provided in accordance with a linear relationship $A = B_1 AOA + B_2$, where AOA represents the aircraft angle of attack and the first additive factor $A_2$ is provided in accordance with a linear relationship $A_2 = C_1 AOA + C_2$. When the aircraft flap setting is 30°, $A_1$ is defined by the linear relationship $B_3 AOA + B_4$ and the multiplicative factor $A_2$ is defined by the linear relationship $A_2 = C_3 AOA + C_4$.

The above-discussed linear relationships for $A_1$ describe the manner in which aircraft angle of attack relates to the slope of at least two linear approximations that relate aircraft center of gravity to aircraft stabilizer position as a function of aircraft angle of attack at each of the two flap settings (25° and 30°). The above-discussed linear relationships for the additive factor $A_2$ describes the manner in which angle of attack relates to the intercept of at least two linear approximations that relate aircraft stabilizer position as a function of aircraft angle of attack at each of the two flap settings (25° and 30°).

BRIEF DESCRIPTION OF THE DRAWING

These and other aspects and advantages of the invention will be more fully understood by reference to the following detailed description when taken in conjunction with the accompanying drawing in which.

DETAILED DESCRIPTION

Figure 1:
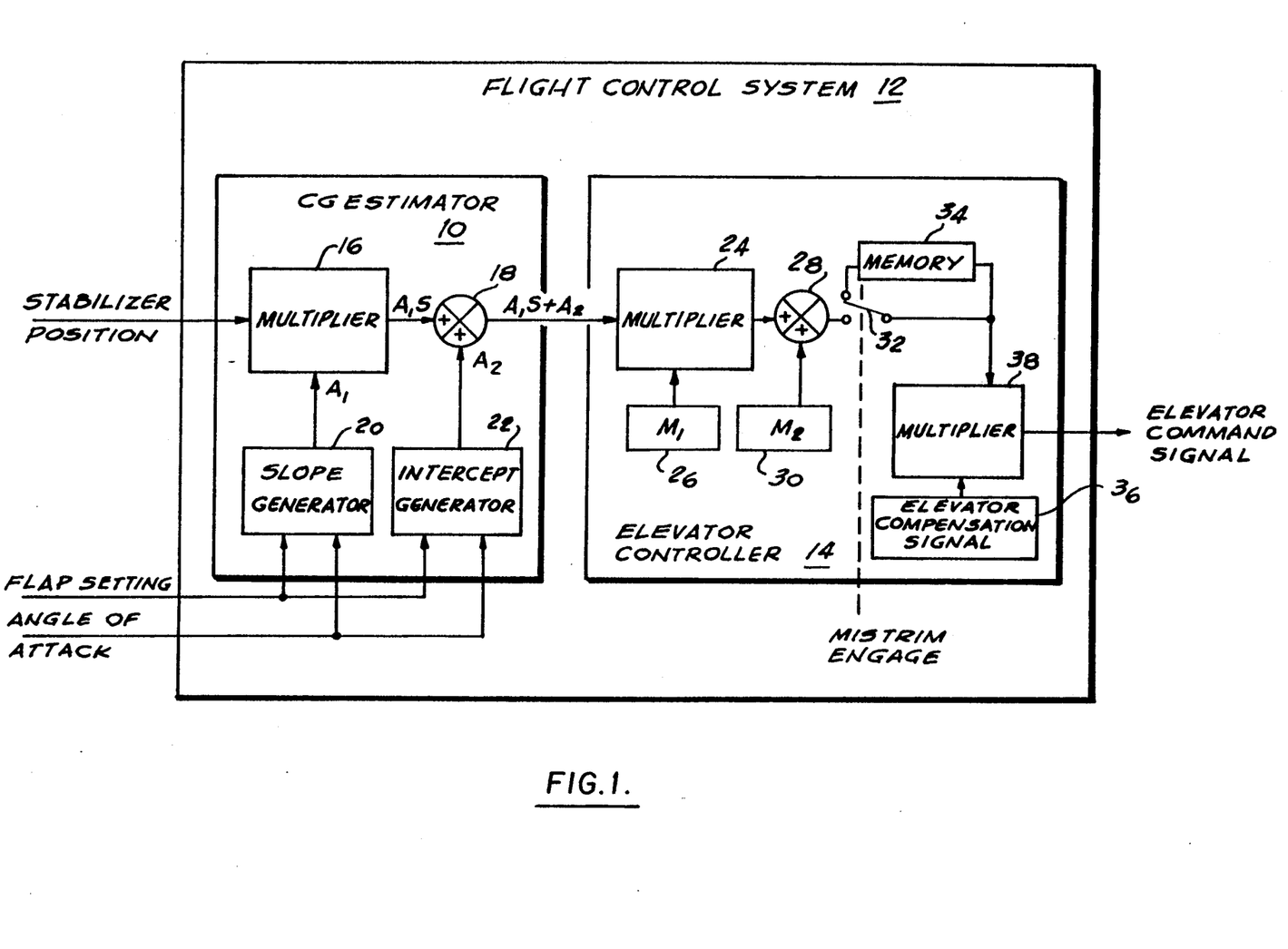
FIG. 1 is a block diagram that depicts a center of gravity estimator that is configured in accordance with the invention and is embodied in an aircraft flight control system for providing stabilizer mistrim during an automatic landing procedure.

FIG. 1 is a block diagram that illustrates a center of gravity estimator (generally denoted by reference numeral 10) that is configured in accordance with the invention and is embodied in an aircraft flight control system 12 along with an elevator controller 14. Operating in conjunction with elevator controller 14, center of gravity estimator 10 provides automatic landing system stabilizer mistrim that is adapted to actual landing conditions. As is indicated in FIG. 1, the center of gravity estimate produced by center of gravity estimator 10 is produced by multiplying the aircraft stabilizer position by a multiplicative factor $A_1$ (performed by multiplier 16), and by adding to the product of the stabilizer position and factor $A_1$ an additive factor $A_2$ (performed by adder 18 in the arrangement of FIG. 1). Thus, in accordance with the invention, the center of gravity estimate is of the form $A_1 S = A_2$, where S represents the position of the aircraft stabilizer (in degrees). As also is indicated in FIG. 1, the multiplicative factor $A_1$ and the additive factor $A_2$ are respectively provided by a slope generator 20 and an intercept generator 22, each of which operate in accordance with the aircraft flap setting and angle of attack. As shall be described more specifically relative to FIGS. 2–7, slope generator 20 and intercept generator 22 respectively provide a multiplicative factor $A_1$ and an additive factor $A_2$ that depend upon both the aircraft angle of attack and aircraft flap settings so that the invention provides an estimate of the center of gravity that takes into account aircraft approach speed (reflected in the angle of attack) and aircraft flap setting.

In the depicted arrangement of FIG. 1 for providing stabilizer mistrim during automatic landing, elevator controller 14 processes the center of gravity estimate, $CG_{EST}$, to provide an elevator compensation signal $M_1$ $CG_{EST} = M_2$, which is a linear approximation to the relationship between the elevator deflection required for a 1 g pull-up maneuver and the position of aircraft center of gravity. In the block diagram arrangement of FIG. 1, a multiplier 24 multiplies the center of gravity estimate provided by center of gravity estimator 10 by the multiplicative factor $M_1$ (indicated at block 26). An adder 28 provides the sum of the $CG_{EST}$ $M_1$ product and the additive factor $M_2$ (which is indicated at block 30).

To provide an appropriate value of elevator compensation during each automatic landing procedure, flight control system 12 of FIG. 1 stores the value of elevator compensation that exists at the time the system engages stabilizer mistrim. In FIG. 1, storing of the current elevator compensation signal is diagrammatically represented by a single pole switch 32, which is activated by the system stabilizer mistrim engage signal. Switch 32 is connected to continuously supply the elevator compensation signal to a memory location 34 prior to the time at which switch 32 is activated (before engagement of stabilizer mistrim). When stabilizer mistrim is engaged, switch 32 is activated and memory location 34 receives no updated values of elevator compensation signal. Thus, the value of elevator compensation signal that existed at the time of stabilizer mistrim engagement is latched into memory location 34.

In the currently preferred realizations of elevator controller 14, the multiplicative factor $M_1$ and the additive factor $M_2$ of the elevator compensation signal are normalized relative to the maximum forward center of gravity location for the aircraft that employs the system. Thus, the appropriate value of elevator command signal is obtained by multiplying the elevator compensation signal by a signal representative of the maximum elevator command that will be required for stabilizer mistrim. In the arrangement of FIG. 1, the maximum elevator command signal is indicated at block 36, with the multiplication of the maximum elevator command signal and the elevator compensation signal being performed by a multiplier 38. Typically, each automatic landing system or flight control system in which the invention can be embodied generates a maximum elevator command (or equivalent stabilizer command) that is determined on the basis of the aircraft flight characteristics during an automatic landing procedure. In current realizations of arrangement shown in FIG. 1, the maximum elevator command signal is established substantially equal to the elevator (or equivalent stabilizer) control required to offset aircraft nose-down pitching moment caused by ground effects when the aircraft approaches the runway (e.g. ground effects when the aircraft landing gear is 20 ft. above the runway).

Figure 2:
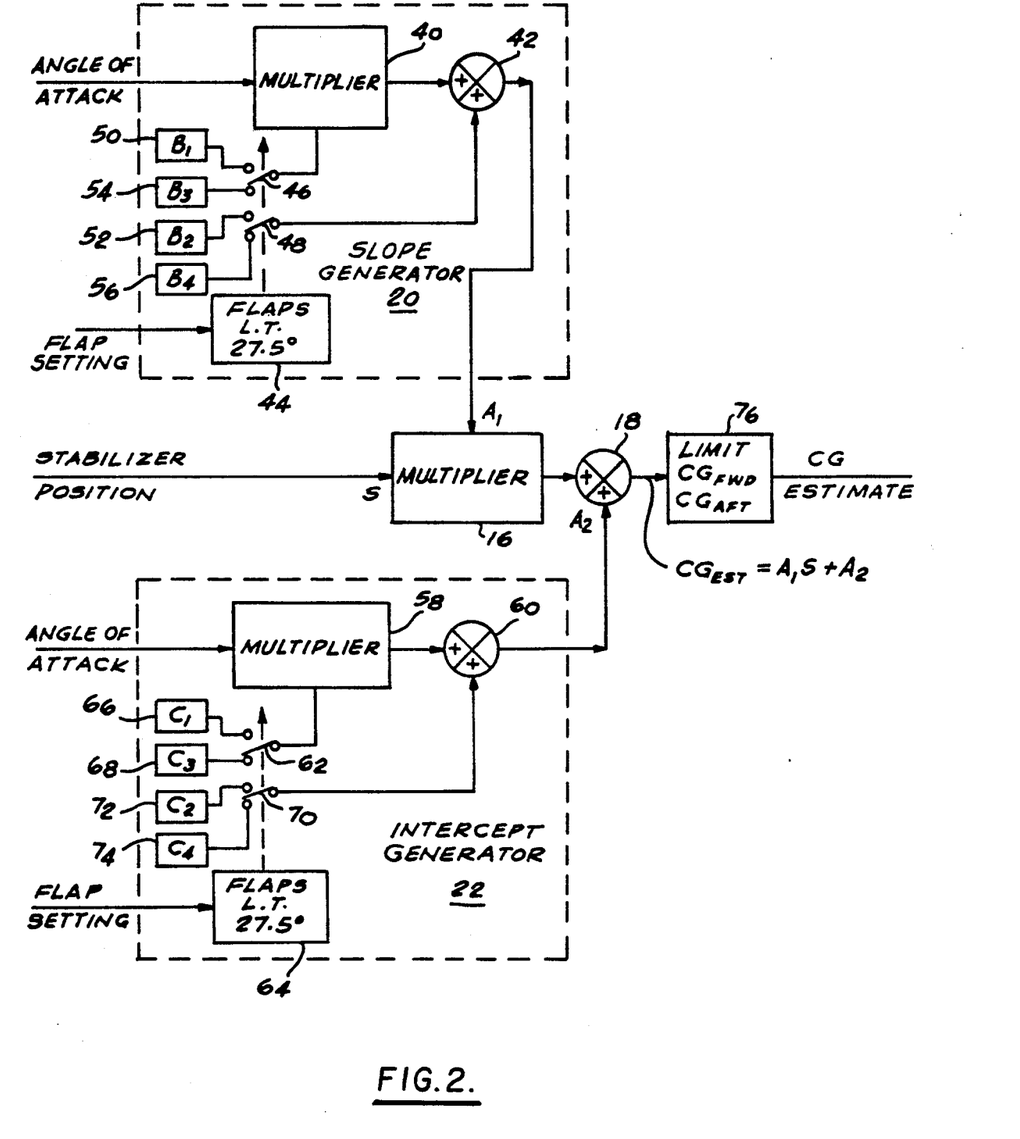
FIG. 2 is a block diagram illustrating in greater detail a center of gravity estimator that is configured in accordance with the invention.

The manner in which center of gravity estimator 10 produces a multiplicative factor $A_1$ and an additive factor $A_2$ that depend upon aircraft body angle of attack and flap setting can be understood in view of FIG. 2. Referring first to the depicted arrangement of slope generator 20, a signal representative of the aircraft angle of attack is multiplied by a multiplicative factor $B_1$ or $B_3$ (indicated by multiplier 40) and the product of the multiplicative factor and aircraft angle of attack is summed with an additive factor $B_2$ or $B_4$ (indicated by adder 42). As can be seen in FIG. 2, selection of multiplicative factor $B_1$ or $B_3$ and selection of additive factor $B_2$ or $B_4$ is made on the basis of the aircraft flap setting. Specifically, large transport and cargo aircraft conventionally utilize one of two flap settings that are identified as 30° flap and 25° flap when executing a landing procedure. In the arrangement of FIG. 2, a readily available flap setting signal is supplied to a flap detector 44. When the aircraft flap setting is 25° (e.g., flap setting less than 27.5°), multiplicative factor $B_1$ is supplied to multiplier 40 of slope generator 20 and additive factor $B_2$ is supplied to adder 42. Thus, when the aircraft is executing an automatic landing procedure with flap setting 25°, the multiplicative factor $A_1$ that is supplied to multiplier 16 can be represented by the equation $A_1 = B_1 AOA + B_2$, where AOA represents the aircraft body angle of attack. On the other hand, when the aircraft is executing an automatic landing with flap setting 30°, multiplicative factor $B_3$ and additive factor $B_4$ are selected and the multiplicative factor $A_1$ that is supplied to multiplier 16 corresponds to the equation $A_1 = B_3 AOA + B_4$. In the depicted arrangement of FIG. 2, selection of a multiplicative factor and additive factor on the basis of flap setting is represented by switches 46 and 48, which are operated by flap detector 44 in accordance with aircraft flap setting. At flap setting 25° multiplicative factor $B_1$ (indicated at block 50) is supplied to multiplier 40 via switch 46 and additive factor $B_2$ (indicated at block 52) is supplied to adder 42 of slope generator 20 via switch 48. When the aircraft flap setting is 30°, switch 46 supplies multiplicative factor $B_3$ (indicated at block 54) to multiplier 40 and switch 46 supplies additive factor $B_4$ (indicated at block 56) to adder 42.

In accordance with the invention, the additive factor $A_2$ that is used in estimating the aircraft center of gravity is of the same form as the multiplicative factor $A_1$. That is, for flap setting 25°, $A_2 = C_1 AOA + C_2$ and for flap setting 30°, $A_2 = C_3 AOA + C_4$. Thus, identical arrangements and methods can be utilized for providing both multiplicative factor $A_1$ and $A_2$. In this regard, intercept generator 22 of FIG. 2 is shown as including a multiplier 58 and an adder 60. A switch 62 that is activated by a flap detector 64 supplies a multiplicative factor $C_1$ (indicated at block 66) to multiplier 58 when the aircraft flap setting is 25° and supplies a multiplicative factor $C_3$ (indicated at block 68) to multiplier 58 when the aircraft flap setting is 30°. Similarly, a switch 70 that is activated by flap detector 64 supplies an additive factor $C_2$ (indicated at block 72) to adder 60 when the aircraft flap setting is 25° and supplies an additive factor $C_4$ (indicated at block 74) to adder 60 when the aircraft flap setting is 30°.

As was described relative to FIG. 1 and as is shown in FIG. 2, the center of gravity estimate provided by the invention is produced by multiplying aircraft stabilizer position by the multiplicative factor $A_1$ and by adding to the product of stabilizer position and $A_1$ the additive factor $A_2$. In the currently preferred embodiments of the invention, the center of gravity estimate that is produced in this manner is limited so that it does not exceed the maximum forward position for the aircraft that employs the invention and does not exceed the maximum aftmost center of gravity position for that aircraft. This limiting operation is indicated in FIG. 2 by limiter circuit 76, which is connected to receive the center of gravity estimate provided by adder 18.

It will be recognized by those skilled in the art that once suitable multiplicative factors and additive factors are determined, the block diagram, control law arrangements depicted in FIGS. 1 and 2 can be implemented in various manners using specific logic circuitry or a programmable digital processor. In this regard, modern flight control systems, including autopilots and automatic landing systems, basically are digital processors that can be programmed to effect required navigation and flight control laws. Accordingly, in most instances, the invention will be practiced by programming such a flight control system to execute the depicted and discussed control laws. Although suitable multiplicative and additive factors for the practice of the invention can be determined by various analytical and empirical techniques, the currently preferred method of determining the required multiplicative and additive factors can be understood in view of FIGS. 3-7. In addition, the various relationships that are graphically depicted in these Figures provide a fuller understanding of the manner in which the invention operates to estimate aircraft center of gravity location on the basis of stabilizer position, aircraft body angle of attack and aircraft flap setting.

To ensure that the invention provides a relatively accurate center of gravity estimate for all automatic landing conditions, the methodology and arrangement of the invention and the values of the above-discussed multiplicative additive factors should be based upon the entire landing envelope of the aircraft that employs the invention. For example, during development of the invention and the attendant determination of multiplicative and additive factors, the landing envelope for the aircraft of interest consisted of 24 landing conditions in which:

(a) the landing gear was down and the aircraft glide path was −3° (nominal glide slope angle);

(b) the aircraft either was at maximum landing weight or minimum landing weight (e.g., minimum flight weight plus an allowance such as 40,000 lbs. for light fuel, cargo and passenger load);

(c) the aircraft center of gravity was located either at maximum forward position or maximum aft position;

(d) the landing was executed either with 25° flap setting or 30° flap setting; and (e) the aircraft approached the runway at nominal approach speed, 5 knots above nominal approach speed and 20 knots above nominal approach speed. To provide information from which the relationship between stabilizer mistrim and aircraft landing condition (i.e. aircraft center of gravity, angle of attack and flap setting) could be ascertained, automatic landings were executed under each of the 24 landing conditions that defined the aircraft landing envelope. Both the aircraft body angle of attack and the stabilizer trim necessary to offset aircraft nose-down moment was recorded for each of the 24 flight conditions. Although a flight simulator was used in determining the particular data discussed herein, flight tests and other known techniques could be employed if necessary.

Figure 3:
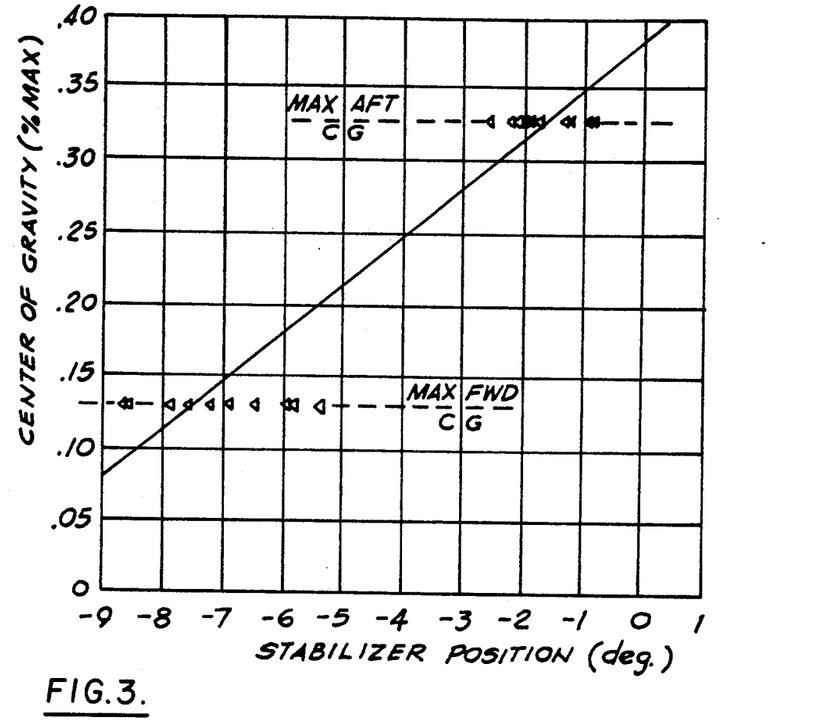
FIG. 3 graphically depicts the relationship between aircraft center of gravity and stabilizer position for various automatic landing conditions that define an overall envelope of automatic landing profiles.

FIG. 3 illustrates the stabilizer trim position for each of the 24 above-mentioned landing conditions with stabilizer position being shown relative to the location of the aircraft center of gravity (i.e., 12 data points being shown for maximum forward center of gravity condition and 12 data points be shown for maximum aft center of gravity condition). As can be seen in FIG. 3, a relatively wide range of stabilizer positions is exhibited relative both to landings with maximum forward center of gravity and landings with maximum aft center of gravity. This variation in stabilizer position is caused by variation in aircraft trim angle of attack (which is dependent upon airspeed and weight), flap position, and trim thrust (which is dependent upon aircraft angle of attack, weight and flight path angle).

Figure 4:
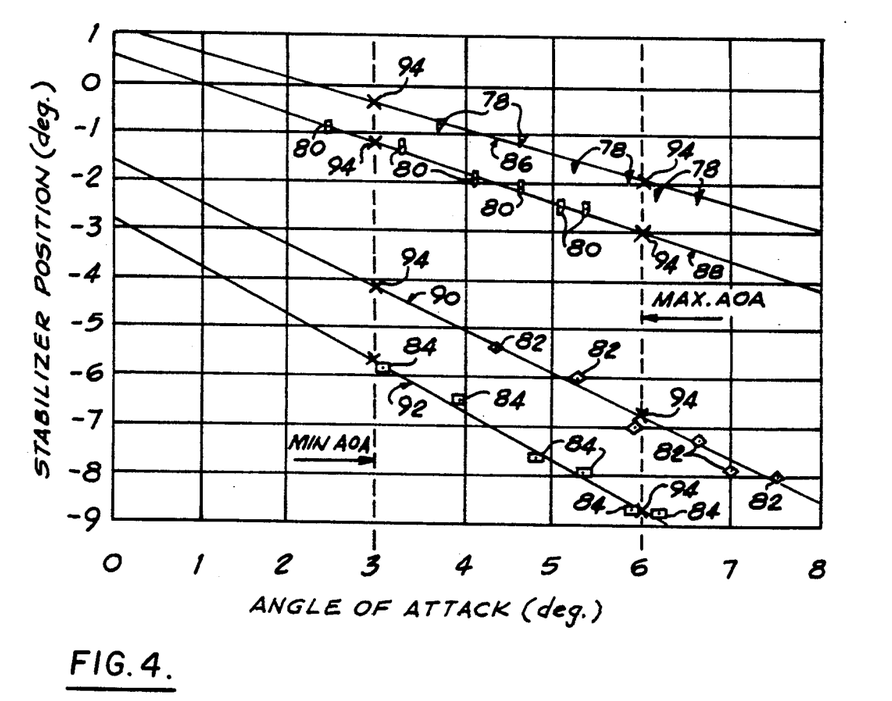
FIG. 4 depicts the relationship between the stabilizer position and aircraft angle of attack for the automatic landing conditions used to generate the data of FIG. 3, with separate relationships being depicted for each of four categories of automatic landing conditions that take into account the two conventional flap settings used during an automatic landing and center of gravity at maximum aft and maximum forward position.

The relationship between stabilizer position and aircraft angle of attack for the above-discussed 24 landing conditions is depicted in FIG. 4. In FIG. 4, in order to in effect remove the flap and angle of attack effect from the data of FIG. 3, the data for the 24 landing conditions has been divided into four separate groups or categories on the basis of flap position and center of gravity location. Specifically, in FIG. 4:

(a) the six data points identified by reference numeral 78 correspond to landing conditions in which the flap setting is 25° when the center of gravity is at the aftmost position;

(b) the six data points identified by reference numeral 80 correspond to landing conditions in which the aircraft flap setting is 30° when the center of gravity is at the aftmost position;

(c) the six data points identified by reference numeral 82 correspond to landing conditions in which the aircraft flap setting is 25° when the center of gravity is at the forwardmost position; and (d) the six data points identified by reference numeral 84 correspond to landing conditions in which the flap setting is 30° and the center of gravity is at the forwardmost position.

As is indicated in FIG. 4, the relationship between stabilizer position and angle of attack for each of the above groups or categories of landing conditions can be closely approximated by a straight line. In this regard, lines 86, 88, 90 and 92 in FIG. 4 respectively provide an approximation to the stabilizer position/angle of attack relationship for data points 78, data points 80, data points 82, and data points 84. Thus, lines 86, 88, 90 and 92 respectively approximate the relationship between stabilizer position and aircraft angle of attack for each of the four above-mentioned categories of landing conditions (flap setting 25°/cg maximum aft; flap setting 30°/cg maximum aft; flap setting 25°/cg maximum forward; and flap setting 30°/cg maximum forward).

The data shown in FIG. 4 confirms generally recognized relationships between stabilizer mistrim and the conditions under which the aircraft is executing an automatic landing. Specifically, at any given angle of attack (combination of ground speed and aircraft weight), the amount of stabilizer trim required for an aft center of gravity condition is substantially greater than the trim required for a landing in which the center of gravity is at the forwardmost position. Further, under both maximum forwardmost and maximum aftmost center of gravity conditions, the stabilizer trim required for a flap setting of 30° is greater than the stabilizer trim required for flap setting 25°. More important, FIG. 4 quantizes the relationships in a manner that allows a determination of the relationship between aircraft center of gravity and stabilizer position as a function of aircraft angle of attack and flap setting.

More specifically, the stabilizer position/angle of attack relationships provided by lines 86, 88, 90 and 92 of FIG. 4 can be transformed in a manner that provides the relationship between aircraft center of gravity and stabilizer position as a function of aircraft flap setting and angle of attack. For example, the angle of attack during an automatic landing procedure is nominally within the range of 3° to 6°, with the exact angle of attack being determined by the glide slope beam angle for the airport at which the landing is being made. Using the equations for the four stabilizer position/angle of attack linear relationships (lines 86, 88, 90 and 92) (which can readily be determined by conventional means such as a computer implemented first degree least squares fit), the stabilizer position for 3° angle of attack landing approach and a 6° angle of attack landing approach can be found at both maximum forward center of gravity and maximum aft center of gravity for each of the two flap settings (30° and 25°). The eight values of stabilizer position that are found in this manner are identified in FIG. 4 by reference numeral 94. Since four of the stabilizer values correspond to landing conditions with aftmost center of gravity and the remaining four stabilizer values correspond to landings with forwardmost center of gravity, data points 94 can be used to define four linear relationships between aircraft center of gravity and stabilizer position as a function of flap setting (25° and 30°) and the maximum and minimum angle of attack (3° and 6°).

Figure 5:
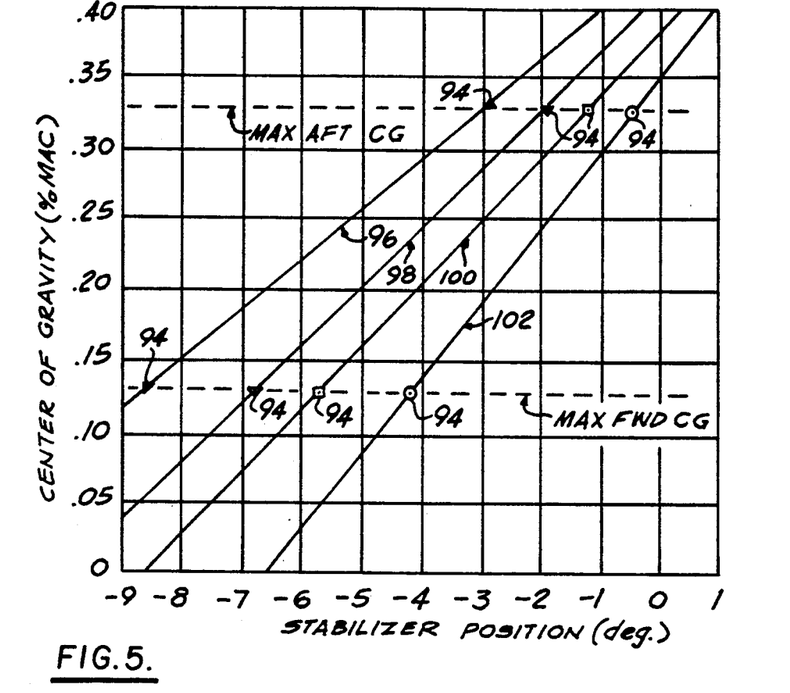
FIG. 5 graphically depicts the relationship between aircraft center of gravity and stabilizer position with separate relationships being depicted for each of four categories of automatic landing conditions that take into account the two conventional flap settings used during an automatic landing and the maximum and minimum expected angle of attack during an automatic landing.

The four linear relationships between aircraft center of gravity and stabilizer position for the previously discussed 24 landing positions (i.e., the aircraft landing envelope) are shown in FIG. 5. Specifically, in FIG. 5, lines 96, 98, 100 and 102 pass through the data points 94 and respectively provide the relationship between aircraft center of gravity location and stabilizer position for:

(a) a landing with 6° angle of attack and 30° flap setting;
(b) a landing with 6° angle of attack and 25° flap setting;
(c) a landing with 3° angle of attack and 30° flap setting; and
(d) landing with 3° angle of attack and 25° flap setting.

The manner in which the relationship between aircraft center of gravity and stabilizer position changes as a function of flap setting and angle of attack can be determined from equations that parametrically express the four center of gravity/stabilizer position relationships of FIG. 5 (i.e., the equations that define lines 96, 98, 100 and 102 in FIG. 5). In particular, expressing the four depicted center of gravity/stabilizer position relationships in conventional slope-intercept format yields two slope and two intercept values (angle of attack=3° and 6°) at each flap setting (25° and 30°). These four slope values can be used to define two linear relationships that describe the manner in which the slope of the center of gravity/stabilizer position relationship changes as a function of aircraft angle of attack and flap setting. More specifically, use of a first degree least squares approximation (or other conventional technique) with the two slope values for 25° flap setting (i.e., flap setting 25° /angle of attack 3° and flap setting 25°/angle of attack 6°) provides a parametric expression that relates angle of attack to the slope of the 25° flap setting center of gravity/stabilizer position relationships of FIG. 5. This linear slope/angle of attach relationship for flap setting 25° is identified by reference numeral 104 in FIG. 6. Similarly, the two slope values for 30° flap setting and angles of attack equal to 3° and 6° can be used to define a linear relationship that relates angle of attack to the slope of the 30° flap setting center of gravity/stabilizer position relationships of FIG. 5 (i.e., the linear relationships identified by reference numerals 96 and 100 in FIG. 5). The slope/angle of attack linear relationship for 30° flap setting is identified in FIG. 6 by reference numeral 106.

Parametric expressions that separately relate angle of attack to the intercept value of the linear center of gravity/stabilizer position relationships shown in FIG. 5 can be determined for 25° flap setting and 30° flap setting by using a procedure that is analogous to the procedure described for determining the parametric relationships between aircraft angle of attack and the slope of the center of gravity/stabilizer position relationship. The linear intercept/angle of attack relationships for the previously mentioned 24 landing conditions are shown in FIG. 7, with the intercept/angle of attack relationship for 25° flap setting being identified by reference numeral 108 and the intercept/angle of attack relationship for 30° flap setting being identified by reference numeral 110.

Figure 6:
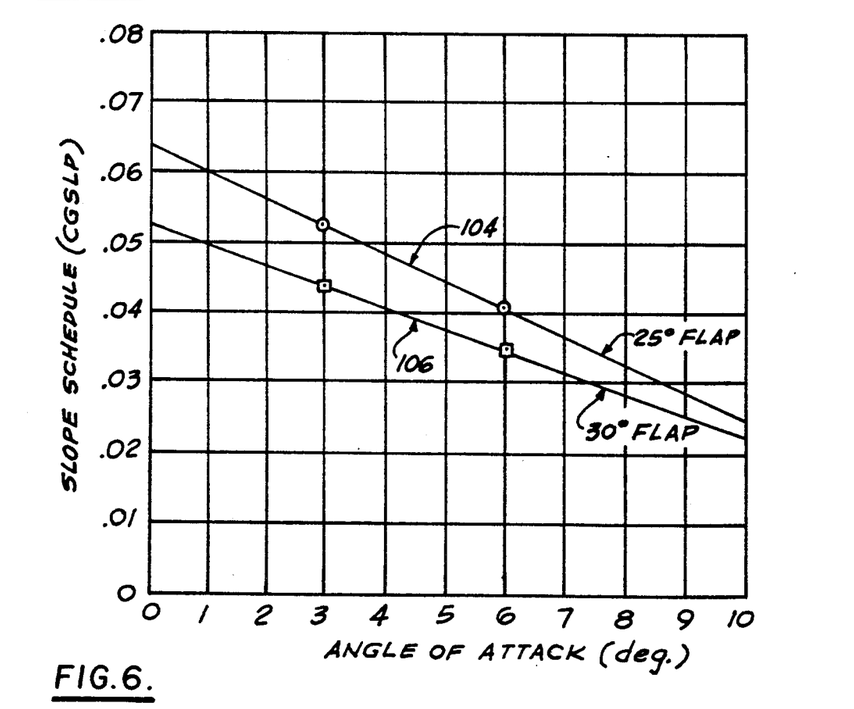
FIG. 6 graphically depicts the relationship between a multiplicative factor that is utilized in the practice of the invention and aircraft angle of attack with separate relationships being depicted for each of the two conventional landing flap settings.
Figure 7:
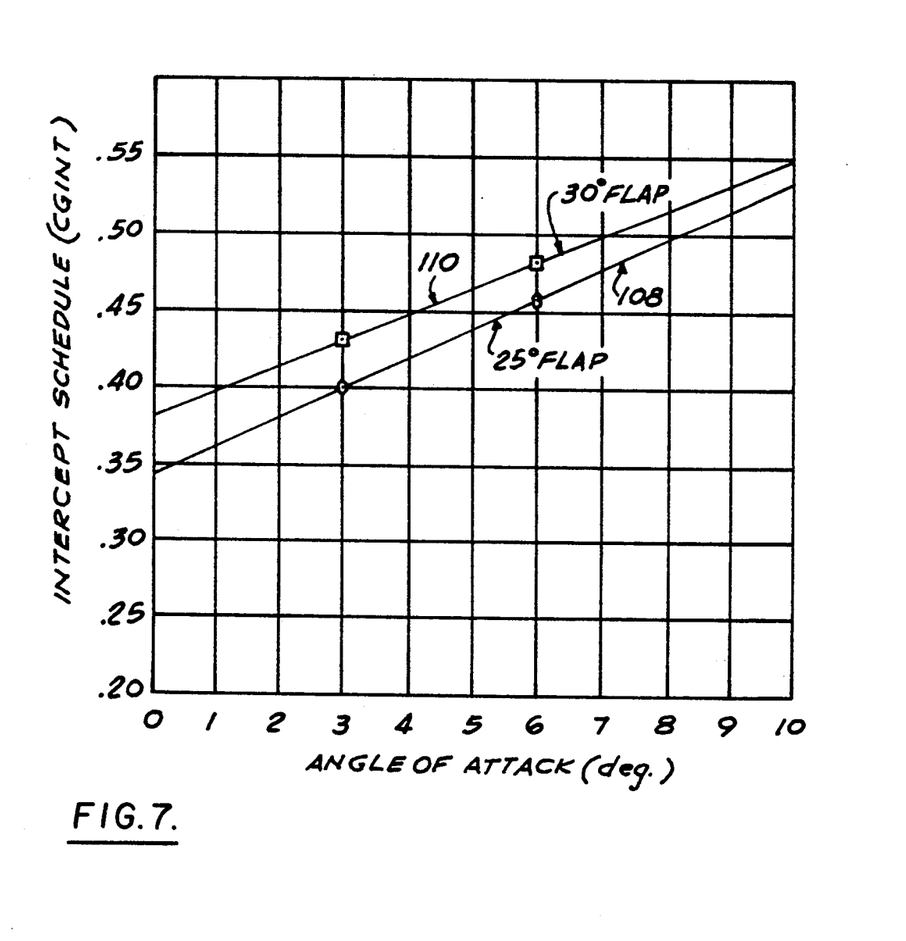
FIG. 7 graphically depicts the relationship between an additive factor that is used in the practice of the invention and aircraft angle of attack, with separate relationships being depicted for each of the two flap settings that are conventionally utilized in an automatic landing.

Considering the slope and intercept relationships shown in FIGS. 6 and 7 in view of the linear center of gravity/stabilizer position relationships shown in FIG. 5, it can be recognized that an estimate of the location of the aircraft center of gravity ($CG_{EST}$) can be defined in terms of the following set of linear equations $CG_{EST} = A_1 S + A_2$ $A_1 = B_1 AOA + B_2$ for 25° flap setting $A_1 = B_3 AOA + B_4$ for 30° flap setting $A_2 = C_1 AOA + C_2$ for 25° flap setting $A_2 = C_3 AOA + C_4$ for 30° flap setting where, S represents stabilizer position, AOA represents aircraft angle of attack, $B_1$ and $B_2$ respectively represent the slope and intercept values for the 25° flap setting parametric expression that relates angle of attack to the slope of the center of gravity/stabilizer position relationship (i.e., the slope and intercept values of line 104 in FIG. 6), $B_3$ and $B_4$ respectively represent the slope and intercept values for the 30° flap setting parametric expression that relates angle of attack to the slope of the center of gravity/stabilizer position relationship (i.e., the slope and intercept value of line 106 in FIG. 6), $C_1$ and $C_2$ respectively represent the slope and intercept values of the 25° flap setting parametric expression that relates angle of attack to the intercept of the center of gravity/stabilizer position relationship (i.e., the slope and intercept values of line 108 in FIG. 7), and $C_3$ and $C_4$ respectively represent the slope and intercept values for the 30° flap setting parametric expression that relates angle of attack to the intercept value of the center of gravity/stabilizer position relationship (i.e., the slope and intercept values of line 110 of FIG. 7).

Comparing the above set forth linear equations to FIGS. 1 and 2, it can be recognized that the procedure described relative to FIGS. 3-7 provides a method of determining both the multiplicative factors ($A_1$, $B_1$, $B_3$, $C_1$ and $C_3$) and the additive factors ($A_2$, $B_2$, $B_4$, $C_2$ and $C_4$) that are used in the practice of the invention.

As previously noted, those skilled in the art will recognize that various other analytical and empirical methods can be employed for determining multiplicative and additive factors that are suitable for use in practicing the invention. As also will be recognized, other various changes and modifications can be made in the embodiments of the invention disclosed herein without departing from the scope and the spirit of the invention. For example, in some applications of the invention it may be necessary or desirable to extend the flap settings and angle of attack range utilized in determining the multiplicative and additive factors to cover either the entire flight regime for the aircraft or a broader portion of the flight regime than need to be considered in embodying the invention for improved stabilizer mistrim during automatic landing procedures.

The embodiments of the invention in which an exclusive property or privilege is claimed are defined as follows:

1. A method of estimating the location of aircraft center of gravity in an aircraft flight control system of the type that employs aircraft center of gravity location for executing one or more control laws that establish the flight path of said aircraft, said method comprising:

obtaining from said aircraft flight control system signals representative of the aircraft stabilizer position, the aircraft flap setting and the aircraft angle of attack;

multiplying said signal representative of aircraft stabilizer position by a first multiplicative factor, which is based on said signal representative of said aircraft angle of attack and said signal representative of said aircraft flap setting;

adding to the product of said signal representative of said aircraft stabilizer position and said first multiplicative factor a first additive factor which is based on said signal representative of said aircraft angle of attack and said signal representative of said aircraft flap setting; and supplying as said estimate of said location of said aircraft center of gravity a flight control signal representative of the value obtained from said steps of multiplying said signal representative of said aircraft stabilizer position by said first multiplicative factor and adding said first additive factor, said flight control signal being supplied to said aircraft flight control system for controlling a flight control surface.

2. The method of claim 1, wherein said one or more control laws executed by said flight control system includes a control law for establishing stabilizer mistrim during automatic landing procedures and wherein said estimate of said location of said center of gravity is multiplied by a multiplicative factor $M_1$ and the product of said multiplicative factor $M_1$ and said center of gravity estimate is added to an additive factor $M_1$ to provide an elevator control signal that results in said stabilizer mistrim.

3. The method of claim 1 wherein said first multiplicative factor is determined by the steps of multiplying said signal representative of said aircraft angle of attack by a second multiplicative factor and adding to the product of said signal representative of said aircraft angle of attack and said second multiplicative factor a second additive factor; and wherein said first additive factor is determined by the steps of multiplying said signal representative of said aircraft angle of attack by a third multiplicative factor and adding to the product of said signal representative of said aircraft angle of attack and said third multiplicative factor a third additive factor.

4. The method of claim 3 wherein said signal representative of said aircraft flap setting is indicative of whether said aircraft flap setting is a first or second predetermined flap setting; and wherein said method further comprises the steps of:

determining from said signal representative of said aircraft flap setting whether said aircraft flap setting is said first or second predetermined flap setting;

establishing a first set of values for said second and third multiplicative factors and said second and third additive factors when said flap setting is said first predetermined flap setting; and establishing a second set of values for said second and third multiplicative factors and said second and third additive factors when said flap setting is said second predetermined flap setting.

5. The method of claim 4 wherein:

said values supplied as said second multiplicative factor and said second additive factor when said flap setting is said first predetermined flap setting are based on the slope values of at least two linear relationships that substantially define the relationship between aircraft center of gravity location and aircraft stabilizer setting as a function of said first flap setting and predetermined values of aircraft angle of attack;

said values supplied as said second multiplicative factor and said second additive factor when said flap setting is said second predetermined flap setting are based on the slope values of at least two linear relationships that substantially define the relationship between aircraft center of gravity location and aircraft stabilizer position as a function of said second flap setting and predetermined values of aircraft angle of attack;

said values supplied as said third multiplicative factor and said third additive factor when said flap setting is said first predetermined flap setting are based on the intercept values of said at least two linear relationships that substantially define the relationship between said aircraft center of gravity location and said aircraft stabilizer position as a function of said first flap setting and said predetermined values of said aircraft angle of attack; and said values supplied as said third multiplicative factor and said third additive factor when said flap setting is said second predetermined flap setting are based on the intercept values of said at least two linear relationships that substantially define the relationship between said aircraft center of gravity location and said aircraft stabilizer position as a function of said second flap setting and said predetermined values of said aircraft angle of attack.

6. The method of claim 5 wherein said one or more control laws executed by said flight control system includes a control law for establishing stabilizer mistrim during automatic landing procedures and wherein said estimate of said location of said center of gravity is multiplied by a multiplicative factor $M_1$ and the product of said multiplicative factor $M_1$ and said center of gravity estimate is added to an additive factor $M_2$ to provide an elevator control signal that results in said stabilizer mistrim.

7. An improved aircraft flight control system of the type that controls the flight of an aircraft by processing signals representative of aircraft attitude and signals representative of the condition of aircraft control surfaces, said signals including signals representative of the location of said aircraft center of gravity, the angle of attack of said aircraft and the aircraft flap setting, wherein said improvement comprises means for generating a signal representative of said location of aircraft center of gravity, said means including:

first multiplier means for multiplying said signal representative of said aircraft stabilizer position by a first multiplicative factor $A_1$;

first adder means operatively coupled to said multiplier means for receiving a signal representative of the product of said signal representative of said stabilizer position and said multiplicative factor $A_1$, said adder means adding to said signal representative of said product an additive factor $A_2$; and means operatively coupled to said adder means for utilizing the signal supplied by said adder means as an estimate of the aircraft center of gravity during the execution of at least one control law that controls said flight of said aircraft.

8. The improvement of claim 7 wherein said signal representative of said aircraft flap setting is indicative of whether said aircraft flap setting is a first predetermined setting or a second predetermined setting; and wherein said means for estimating the location of the aircraft center of gravity further includes:

signal processing means responsive to said signal representative of said aircraft flap setting and said signal representative of said aircraft angle of attack, said signal processing means including means for supplying to said multiplier means a first value of said multiplicative factor $A_1$ when said flap setting is said first predetermined setting and for supplying a second value of said multiplicative value $A_1$ when said flap setting is said second predetermined setting, said signal processing means further including means for supplying to said adder means a first value of said additive factor $A_2$ when said flap setting is at said first predetermined setting and a second value of said additive factor $A_2$ when said flap setting is at said second predetermined setting.

9. The improvement of claim 8 wherein said first and second values of said first multiplicative factor $A_1$ respectively correspond to the expressions $A_1 = B_1 AOA + B_2$ and $A_1 + B_3 AOA + B_4$ and said first and second values of said additive factor $A_2$ respectively correspond to $A_2 = C_1 AOA + C_2$ and $A_2 = C_3 AOA + C_4$, where AOA represents the angle of attack of said aircraft, $B_1$, $B_3$, $C_1$ and $C_3$ respectively represent second, third, fourth and fifth multiplicative factors and $B_2$, $B_4$, $C_2$ and $C_4$ respectively represent second, third, fourth and fifth additive factors; and wherein said signal processing means includes:

detection means responsive to said signal representative of said aircraft flap setting for supplying a signal indicative of whether said aircraft flap setting is said first predetermined setting or said second predetermined setting;

second multiplier means responsive to said signal representative of said aircraft angle of attack and an applied multiplicative factor, said second multiplier means supplying a signal representative of the product of said applied multiplicative factor and sais signal representative of said aircraft angle of attack;

first signal selection means responsive to said signal supplied by said detection means for supplying said second multiplicative factor $B_1$ to said second multiplier means when said aircraft flap setting is said first predetermined setting and for supplying said third multiplicative factor $B_3$ to said second multiplier means when said aircraft flap setting is said second predetermined setting;

second adder means responsive to said signal supplied by said second multiplier means and an applied additive factor, said second adder means supplying a signal representative of the sum of said applied additive factor and said signal supplied by said second multiplier means;

second signal selection means responsive to said signal supplied by said detection means for supplying said second additive factor $B_2$ to said second adder means when said aircraft flap setting is said first predetermined setting and for supplying said third additive factor $B_4$ to said second adder means when said aircraft flap setting is said second predetermined setting;

third multiplier means responsive to said signal representative of said aircraft angle of attack and an applied multiplicative factor, said third multiplier means for supplying a signal representative of the product of said applied multiplicative factor and said signal representative of said aircraft angle of attack;

third signal selection means responsive to said signals supplied by said detection means for supplying said fourth multiplicative factor $C_1$ to said third multiplier means when said aircraft flap setting is said first predetermined setting and for supplying said fifth multiplicative factor $C_3$ to said third multiplier means when said aircraft flap setting is said second predetermined setting;

third adder means responsive to said signal supplied by said third multiplier means and an applied additive factor, said third adder means for supplying a signal representative of the sum of said applied additive factor and said signal supplied by said third multiplier means;

fourth signal selection means responsive to said signal supplied by said signal detection means for supplying said fourth additive factor $C_2$ to said third adder means when said aircraft flap setting is said first predetermined setting and for supplying said fifth additive factor $C_4$ to said third multiplier means when said aircraft flap setting is said second predetermined setting;

means for supplying said signal supplied by said second adder means to said first multiplier means as said first multiplicative factor $A_1$; and means for supplying said signal supplied by said third adder means to said first adder means as said first additive factor $A_2$.

* * * * *

UNITED STATES PATENT AND TRADEMARK OFFICE
CERTIFICATE OF CORRECTION

PATENT NO. : 5,034,896
DATED : July 23, 1991
INVENTOR(S) : M. Orgun et al.

It is certified that error appears in the above-identified patent and that said Letters Patent is hereby corrected as shown below:

| COLUMN | LINE | |
|---|---|---|
| 3 | 53 | delete "$A = B_1 AOA + B_2$" and insert therefor --$A_1 = B_1 AOA + B_2$-- |
| 5 | 16 | delete "$CG_{EST} = M_2$" and insert therefor --$CG_{EST} + M_2$-- |
| 9 | 44 | delete "(d) landing" and insert therefor --(d) a landing-- |
| 14 | 4 | delete "sais" and insert therefor --said-- |

Signed and Sealed this

Eighth Day of February, 1994

Attest:

BRUCE LEHMAN

Attesting Officer     Commissioner of Patents and Trademarks